(12) United States Patent
Yang

(10) Patent No.: US 6,524,358 B2
(45) Date of Patent: Feb. 25, 2003

(54) CYCLONE DUST COLLECTOR AND VACUUM CLEANER USING SUCH DUST COLLECTOR

(75) Inventor: Byung-Sun Yang, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/768,358

(22) Filed: Jan. 25, 2001

(65) Prior Publication Data

US 2002/0020154 A1 Feb. 21, 2002

(30) Foreign Application Priority Data

Aug. 19, 2000 (KR) ............................................. 00-48088
Nov. 17, 2000 (KR) ............................................. 00-68637

(51) Int. Cl.$^7$ .......................... B01D 50/00; B01D 45/12
(52) U.S. Cl. ............................ 55/337; 55/426; 55/433; 55/459.1; 55/505; 55/521; 55/DIG. 3; 15/353
(58) Field of Search .............................. 55/337, 459.1, 55/394, 426, 432, 433, 505, 521, DIG. 3; 15/347, 350, 353

(56) References Cited

U.S. PATENT DOCUMENTS 6,209,167 B1 * 4/2001 Rooney et al. ............ 15/327.1
6,231,645 B1 * 5/2001 Conrad et al. ................ 95/271
6,269,518 B1 * 8/2001 Yung ............................ 15/352
6,341,404 B1 * 1/2002 Salo et al. ..................... 15/350

* cited by examiner

Primary Examiner—Robert A. Hopkins
(74) Attorney, Agent, or Firm—Birch, Stewart, Kolasch & Birch, LLP

(57) ABSTRACT

A cyclone dust collector for vacuum cleaners, designed to effectively remove solids, including microparticles, from dust-laden air, is disclosed. This dust collector has an openable cyclone dust collection casing 200, with an air inlet port 100 formed on the casing such that the port tangentially introduces dust-laden air into the casing while forming a cyclone of the air within the casing. An air exhaust port 302 is formed at the top end of the casing for discharging the air from the casing to the atmosphere. A dust collecting filter 350 is provided within the casing for filtering the air before the air is discharged from the casing to the atmosphere through the air exhaust port. A suction unit 320 is connected to the casing 200, and forms a pressurized air current within the casing. A dust collecting chamber 210 is defined within the casing 200 at a lower portion by a horizontal partition plate 250, and contains the solids and particles, removed from the air through a cyclone dust collecting process. The cyclone dust collector primarily and secondarily removes solids, particles and other impurities, including microparticles, from the dust-laden air through a cyclone dust collecting process and a filtering process. This cyclone dust collector thus improves the cleaning effect of a vacuum cleaner.

20 Claims, 5 Drawing Sheets

CYCLONE DUST COLLECTOR AND VACUUM CLEANER USING SUCH DUST COLLECTOR

BACKGROUND OF THE INVENTION

1. Field of the Invention

The present invention relates to dust collectors for vacuum cleaners and, more particularly, to a cyclone dust collector for such vacuum cleaners having a simple construction and effectively removing solids, including microparticles, from dust-laden air.

2. Description of the Prior Art

As well known to those skilled in the art, conventional vacuum cleaners are designed to suck dust-laden air under pressure from a target surface using strong suction force generated from a suction motor set within the cleaner body, and to filter the dust-laden air to remove dust, small or powdered solids from the air prior to discharging the filtered air from the cleaner body to the atmosphere.

In the prior art, paper filter bags have been used in such vacuum cleaners for filtering dust-laden air. However, the conventional paper filter bags are problematic in that such a filter bag has to be changed with a new one after a lapse of predetermined time, thus being inconvenient to users. Another problem of the conventional paper filter bags resides in that the filter bags reduce the suction force of the vacuum cleaners due to dust contained in the filter bags. In such a case, the cleaning effect of the vacuum cleaner is reduced.

In an effort to overcome the above problems experienced in the conventional paper filter bags, cyclone dust collectors designed to be almost semi-permanently used without being changed with a new one have been proposed.

Such cyclone dust collectors are conventionally classified into several types. The representative example of the conventional cyclone dust collectors is a dual-type cyclone dust collector, which comprises first and second collecting units connected to each other to form a desired cyclone collector.

In such a dual-type cyclone dust collector, the first collecting unit is used for removing relatively heavier or large-sized solids from dust-laden air, while the second collecting unit is used for removing relatively lighter or small-sized solids from the air.

Such conventional dual-type cyclone dust collectors are advantageous in that they don't require separate paper filter bags, and are improved in their dust collecting effect in comparison with conventional single-type cyclone dust collectors since the dual-type collectors remove dust from dust-laden air twice through first and second cyclone dust collecting processes.

FIG. 1 shows the construction and operation of a conventional dual-type cyclone dust collector. As shown in the drawing, the conventional dual-type cyclone dust collector comprises first and second collecting units 1 and 2, which are connected to each other to form a desired cyclone collector. Of the two collecting units, the first unit 1 is used for removing relatively heavier or large-sized solids from dust-laden air, while the second unit 2 is used for removing relatively lighter or small-sized solids from the air discharged from the first unit 1.

The first collecting unit 1 has an external casing 1a, which forms the external housing of the dual-type cyclone dust collector and acts as a dust collection tub of the first unit 1. A first air guide port 1b is mounted to the upper portion of the external casing 1a, and is used for guiding dust-laden air into the external casing 1a. The first collecting unit 1 also has an air discharging tub 1c, which is concentrically set within the external casing 1a and is provided with a plurality of air discharging holes for allowing primarily processed air from the interior of the external casing 1a into the air discharging tub 1c.

That is, the external casing 1a of the first collecting unit 1 forms the external housing of the dual-type cyclone dust collector, and primarily processes dust-laden air to remove relatively heavier or large-sized solids from the dust-laden air. In the first collecting unit 1, the removed solids are collected in the lower portion of the external casing 1a. The first air guide port 1b guides dust-laden air under pressure from a target surface into the external casing 1a using a suction force formed by a suction unit, comprising a suction fan 3 and a suction motor 4. The air discharging tub 1c is a cylindrical tub, which is concentrically set within the external casing 1a and is provided with air discharging holes for allowing the primarily processed air from the interior of the external casing 1a into the air discharging tub 1c. The primarily processed air, discharged into the air discharging tub 1c through the air discharging holes of the tub 1c, is introduced into the second collecting unit 2 so as to be secondarily and finally processed by said second collecting unit 2 as will be described later herein.

The second collecting unit 2 has an internal casing 2a, which is concentrically set within the air discharging tub 1c of the first collecting unit 1 at the central portion of said tub 1c. A second air guide port 2b is mounted to the upper portion of the internal casing 2a, and is used for guiding the primarily processed air from the interior of the air discharging tub 1c into the internal casing 2a. The second collecting unit 2 also has an air exhaust port 2c, which is used for discharging the finally processed air from the internal casing 2a into the atmosphere. A dust collecting chamber 2d is provided within the second collecting unit 2 at a position under the internal casing 2a. In the embodiment of FIG. 1, the dust collecting chamber 2d is defined within the bottom of the external casing 1a while communicating with the lower open end of the internal casing 2a and being separated from the first collecting unit 1 by a partition wall 2e.

That is, the internal casing 2a of the second collecting unit 2 forms the body of said second collecting unit 2, and receives the primarily processed air from the air discharging tub 1c of the first collecting unit 1 through the second air guide port 2b. The above internal casing 2a has a conical hopper shape, with the diameter of the casing 2a being gradually reduced in a direction from the upper end to the lower open end. The interior of the internal casing 2a communicates with the dust collecting chamber 2d through its lower open end.

An air exhaust pipe 3a extends from the air exhaust port 2c of the second collecting unit 2, with the suction unit comprising the suction fan 3 and the suction motor 4 mounted to the outside end of the air exhaust pipe 3a, thus forming an air suction force for the first and second collecting units 1 and 2. In an operation of the dual-type cyclone dust collector, the suction unit generates a suction force for the dust collector. Due to such a suction force, dust-laden air is forcibly sucked from a target surface into the dust collector through the first air guide port 1b while being pressurized, and is primarily and secondarily processed by the first and second collecting units 1 and 2 prior to being discharged to the atmosphere through the air exhaust port 2c.

The operational effect of such a conventional dual-type cyclone dust collector will be described in detail herein below. When the suction fan 3 is rotated by the suction motor 4, a desired suction force or suction pressure is formed within the dust collector. Therefore, dust-laden air under pressure is sucked from a target surface into the external casing 1a through the first air guide port 1b.

After the dust-laden air is introduced into the external casing 1a through the first air guide port 1b, the air under pressure swirls within the external casing 1a at a high speed. In such a case, some relatively heavier solids are removed from the dust-laden air due to gravity, and are collected on the lower portion of the external casing 1a. The operational theory of such a cyclone dust collector is well known to those skilled in the art, and further explanation is thus not deemed necessary.

The primary cyclone dust collecting process, performed by the first collecting unit 1, cannot remove relatively lighter solids and microparticles from the dust-laden air swirling within the external casing 1a, but allows the relatively lighter solids and microparticles to flow into the air discharging tub 1c along with air so as to be introduced into the internal casing 2a of the second collecting unit 2 through the second air guide port 1b.

In the second collecting unit 2, the air laden with relatively lighter solids and microparticles swirl within the internal casing 2a. During such a swirling action of the dust-laden air within the internal casing 2a, the solids and microparticles are separated from each other due to a difference in centrifugal force between them as follows.

That is, when the dust-laden air swirls within the internal casing 2a, the weighty solids are centrifugally forced to swirl down along the interior surface of the sidewall of the internal casing 2a to be finally dropped into the dust collecting chamber 2d. Meanwhile, the microparticles, having an almost negligible weight, are not centrifugally forced toward the sidewall of the internal casing 2a, but flows at the central portion within the internal casing 2a.

Therefore, the second collecting unit 2 cannot remove such microparticles from air, but allows the microparticles to be discharged to the atmosphere together with processed air through the air exhaust port 2c, even though the unit 2 somewhat effectively removes weighty solids from air by making the solids centrifugally swirl down along the interior surface of the sidewall of the internal casing 2a to be finally dropped into and collected within the dust collecting chamber 2d.

Such a conventional dual-type cyclone dust collector is thus problematic in that its second collecting unit 2 cannot remove such microparticles from air, but undesirably discharges the microparticles to the atmosphere together with processed air through the air exhaust port. This means that the conventional dual-type cyclone dust collector cannot accomplish a desired cleaning effect even though it is necessary for vacuum cleaners to almost completely remove solids, including such microparticles, from air. In the operation of the conventional dual-type cyclone dust collector, the microparticles pass through the suction fan 3 and the suction motor 4 prior to being discharged to the atmosphere, and so the microparticles are deposited on the fan 3 and the motor 4.

Another problem of the conventional dual-type cyclone dust collector resides in that the collector has a complex construction due to the two cyclone collecting units, and so it is very difficult to disassemble or assemble the parts of the collector when it is desired to remove collected dust and solids from the collector or to wash the parts of the collector. Due to the complex construction of the conventional dual-type cyclone dust collector, the number of parts of the collector is increased. This finally increases the production cost and complicates the production process of the dust collector. Such a complex construction of the conventional dual-type cyclone dust collector also requires the size and volume of the collector to be enlarged, and so it is almost impossible to accomplish the recent trend of compactness of the dust collectors or compactness of vacuum cleaners.

In the conventional dual-type cyclone dust collector, the dust collecting chamber 2d of the second collecting unit 2 is set within the external casing 1a of the first collecting unit 1, and so the size of the dust collecting chamber 2d is undesirably limited. This finally limits the dust collecting capacity of the chamber 2d, and so it is necessary for a user to undesirably often remove collected dust and solids from the chamber 2d, thus being inconvenient to the user. Such a problem caused by the dust collecting chamber 2d having a small size may be overcome by enlarging the size of the external casing of the dual-type cyclone dust collector. However, such an enlargement in the size of the dual-type cyclone dust collector is not preferable since the enlarged size of the collector also necessitates an enlargement in the size of vacuum cleaners. This finally fails to accomplish the recent trend of compactness, lightness and smallness of such vacuum cleaners.

SUMMARY OF THE INVENTION

Accordingly, the present invention has been made keeping in mind the above problems occurring in the prior art, and an object of the present invention is to provide a cyclone dust collector for vacuum cleaners, which effectively removes solids, including microparticles, from dust-laden air.

Another object of the present invention is to provide a cyclone dust collector for vacuum cleaners, which has a simple construction, thus accomplishing the recent trend of compactness of the vacuum cleaners.

A further object of the present invention is to provide a cyclone dust collector for vacuum cleaners, which has a compact construction and an enlarged dust collecting capacity, thus being convenient to users.

In order to accomplish the above object, the present invention provides a cyclone dust collector for vacuum cleaners, comprising: an openable cyclone dust collection casing; an air inlet port formed on the sidewall of the casing such that the air inlet port introduces dust-laden air under pressure into the casing while forming a cyclone of the air within the casing; an air exhaust port provided at the top end of the casing for discharging the air from the casing to the atmosphere; a dust collecting filter provided within the casing for filtering the air before the air is discharged from the casing to the atmosphere through the air exhaust port; and a partition plate horizontally installed within the casing at a lower portion to define a dust collecting chamber within the casing at a position under the partition plate, the partition plate being provided with an opening for allowing solids and particles, removed from the air, to pass through the partition plate to reach the dust collecting chamber.

In the cyclone dust collector of this invention, the cyclone dust collection casing comprises: a lower body being open at its top; and a lid covering the open top of the lower body. In addition, the air inlet port is preferably formed at the upper portion of the sidewall of the casing, while the air exhaust port is preferably formed at the central portion of the lid.

In the cyclone dust collector, the dust collecting filter is detachably mounted to the lower surface of the lid at a central position such that it is possible to remove the dust collecting filter from the lid when necessary to wash or change the filter.

The opening of the partition plate is preferably defined by a cutout formed along the outside edge of the partition plate.

In addition, it is preferable to rotatably mount the partition plate to the sidewall of the casing. In an embodiment, the partition plate comprises two semicircular plate parts. In such a case, the two semicircular plate parts are commonly hinged to diametrically opposite positions of the casing at opposite ends of their linear edges, with two stoppers interiorly mounted to the sidewall of the casing so as to support lower surfaces of arcuate edges of the two plate parts. The two plate parts are thus rotatable only upward from the stoppers.

In the cyclone dust collector, the dust collecting filter preferably has a predetermined strength capable of enduring the pressure of the air passing through the filter. In an embodiment, the dust collecting filter has a cylindrical shape, and is corrugated on its surface to have an enlarged air contact surface. The dust collecting filter is preferably and longitudinally corrugated around its circumference. In addition, it is preferable to make the dust collecting filter using polyester. Such a polyester filter can be washed and reused several times.

The present invention also provides a vacuum cleaner, comprising: a body having both an air suction port for receiving dust-laden air under pressure and an air exhaust port for discharging the air from the body to the atmosphere after filtering the air; a suction unit provided within the body at a front portion and generating a suction force for sucking the dust-laden air into the body; and a cyclone dust collector used for removing solids, particles and other impurities from the dust-laden air through a cyclone dust collecting process and a filtering process, the cyclone dust collector being detachably installed within the body at a rear portion.

In the above vacuum cleaner, a cord reel is preferably provided within the body at a position under the cyclone dust collector. This cord reel receives an electric cord of the vacuum cleaner therein when the cord is fully retracted.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
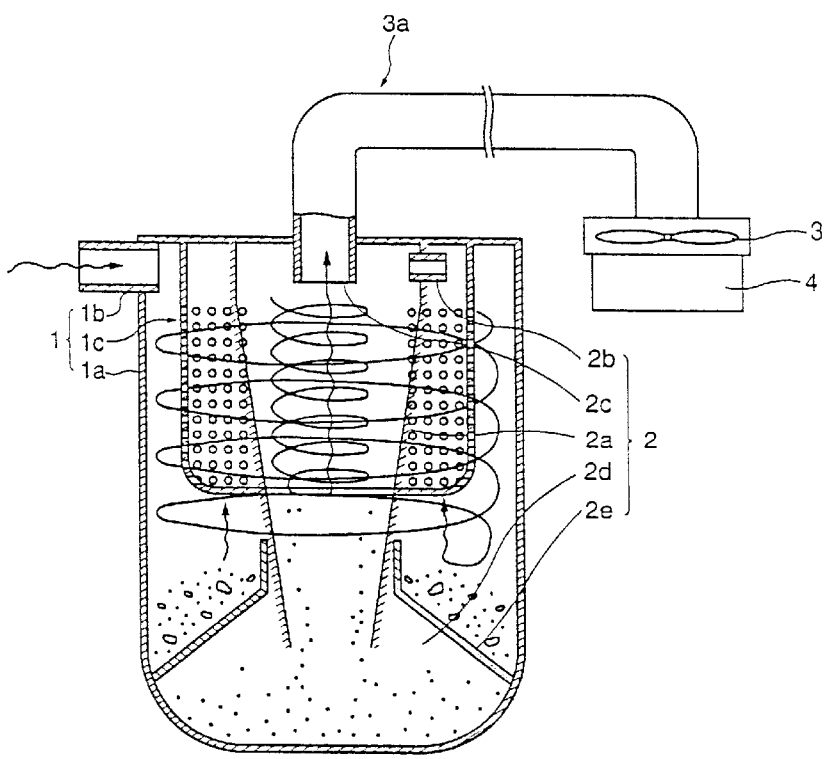
FIG. 1 is a sectional view, showing the construction and operation of a conventional dual-type cyclone dust collector for vacuum cleaners.
Figure 2:
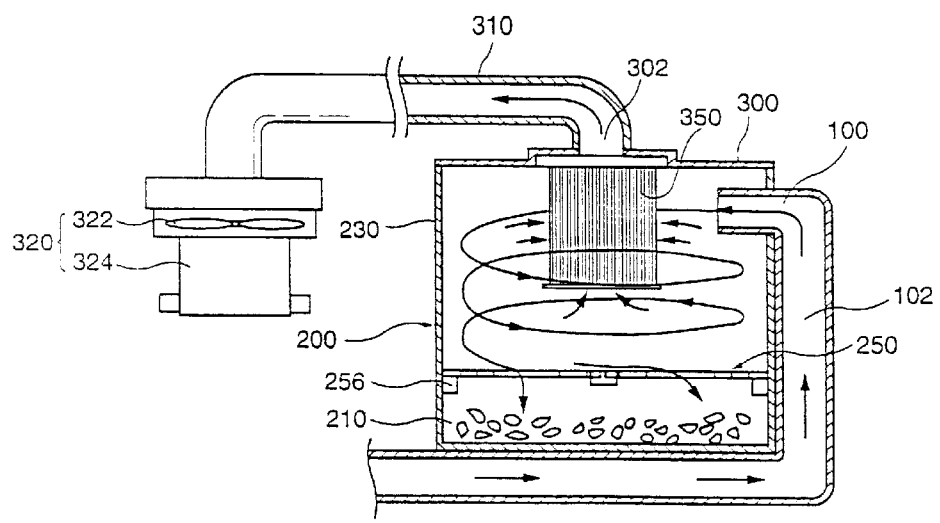
FIG. 2 is a sectional view, showing the construction and operation of a cyclone dust collector for vacuum cleaners in accordance with the preferred embodiment of the present invention.

FIG. 2 is a sectional view, showing the construction and operation of a cyclone dust collector for vacuum cleaners in accordance with the preferred embodiment of the present invention. As shown in the drawing, the cyclone dust collector of this invention has a cyclone dust collection casing 200, which is designed to primarily remove solids from dust-laden air through a cyclone dust collecting process and will be referred to simply as "the cyclone casing" herein below. The cyclone dust collector of this invention also has a dust collecting filter 350, which is used for filtering the primarily processed air discharged from the cyclone casing 200 to remove microparticles from the air.

The cyclone casing 200 is a cylindrical casing having a circular cross-section, and receives dust-laden air through an air inlet port 100. In the embodiment of FIG. 2, the cyclone casing 200 comprises a cylindrical lower body 230 and a lid 300. The lower body 230 is open at its top, while the lid 300 removably covers the open top of the lower body 230.

The air inlet port 100 is mounted at the upper portion of the sidewall of the cyclone casing 200 such that the inside end of the port 100 is tangentially opened in the interior of the casing 200, thus forming a desired cyclone of inlet air within the casing 200. Therefore, when dust-laden air under pressure is introduced into the casing 200, the air forcibly swirls along the interior surface of the sidewall of the casing 200. During such a swirling action of the dust-laden air within the cyclone casing 200, solids or particles are primarily removed from the dust-laden air through a cyclone dust collecting process.

An air suction pipe 102 is connected to the air inlet port 100, and guides dust-laden air to the port 100. In the embodiment of the drawing, the suction pipe 102 diametrically and externally extends along the bottom wall of the casing 200 prior to vertically and externally extend upward along the sidewall of the casing 200, thus finally reaching the air inlet port 100. The inlet end of the above suction pipe 102 is connected to a flexible suction hose extending from a suction nozzle to the body of a vacuum cleaner.

An air exhaust port 302 is provided at the central portion of the lid 300 for discharging finally processed air from the casing 200 to the atmosphere. An air exhaust pipe 310 extends from the exhaust port 302 to a suction unit 320. This suction unit 310 comprises a suction fan 322 and a suction motor 324, and generates a suction force for sucking dust-laden air from a target surface into the cyclone dust collector of this invention. That is, the suction unit 320 forms a pressurized air current within the body of a vacuum cleaner in the same manner as a conventional vacuum cleaner.

The dust collecting filter 350 is installed on the lower surface of the lid 300 at a position around the air exhaust port 302 for secondarily processing the dust-laden air to remove microparticles from the air through a filtering process. That is, this filter 350 is used for filtering dust-laden air, primarily processed within the casing 200 through the cyclone dust collecting process, so as to secondarily and finally remove microparticles from the air. In a brief description, the cyclone dust collector of this invention primarily removes solids from dust-laden air within the cyclone casing 200 through a cyclone dusting collecting process, and secondarily and finally removes microparticles from the air using the filter 350 through a filtering process.

The dust collecting filter 350 is installed on the lower surface of the lid at a position just under the air exhaust port 302, thus filtering the exhaust air to finally remove microparticles from the air.

In the present invention, it is preferable to removably attach the filter 350 to the lower surface of the lid 300 so as to allow a user to easily remove the filter 350 from the lid 300 when it is desired to change, repair or clean the filter 350. In addition, the filter 350 is preferably made of a material having a desired strength capable of effectively enduring the pressurized air current passing through the filter 350. For example, the filter 350 may be preferably made of polyester, which has such a desired strength and is easily formed as a fabric filter. Another advantage of such a polyester filter resides in that it is possible to reuse the filter several times since the polyester filter is washable.

Figure 4:
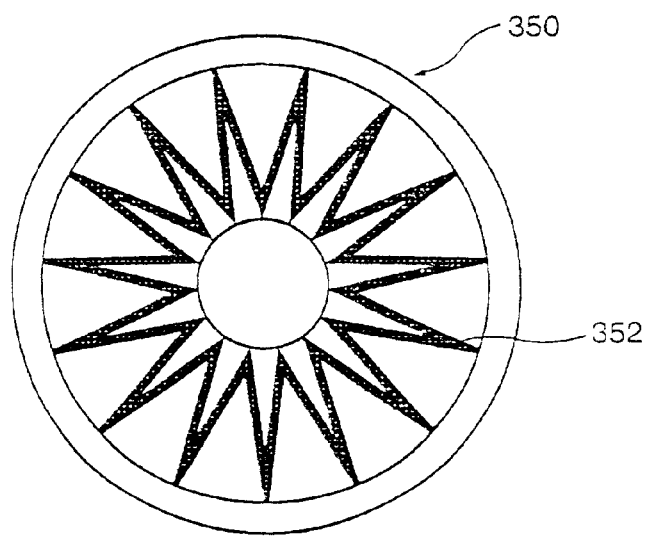
FIG. 4 is a sectional view of a dust collecting filter used in the cyclone dust collector according to the present invention.

FIG. 4 is a sectional view of the dust collecting filter 350 used in the cyclone dust collector of this invention. As shown in the drawing, the practical filtering part 352 of the filter 350 is longitudinally set within the filter housing. This filtering part 352 is longitudinally, regularly and sharply corrugated around its circumference. Since the surface of the filtering part 352 is corrugated as described above, it is possible to enlarge the air contact surface of the filtering part 352. This finally improves the filtering effect of the dust collecting filter 350. In the preferred embodiment of FIG. 4, the practical filtering part 352 of the filter 350 is longitudinally, regularly and sharply corrugated around its circumference. However, it should be understood that the shape of the filtering part 352 is not limited to the above-mentioned shape, but may be somewhat freely changed without affecting the functioning of this invention. For example, the desired enlargement in the air contact surface of the filtering part may be accomplished by making the filtering part have a conventional bellows structure.

However, regardless of the structure of the filtering part of the filter, it is necessary for the filtering part to have a desired strength capable of maintaining its shape irrespective of the pressurized air current passing through the filtering part.

Figure 3:
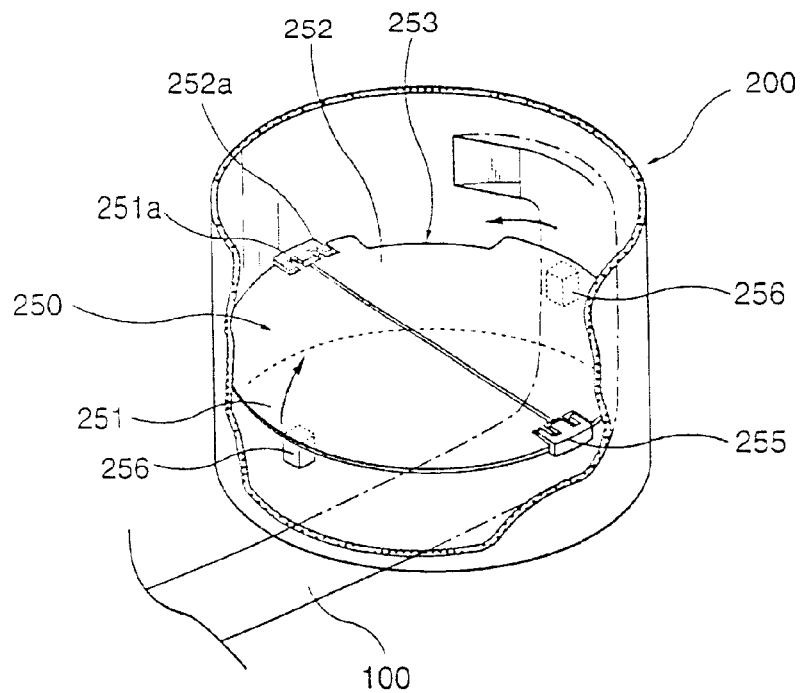
FIG. 3 is a partially broken perspective view of a cyclone dust collection casing of the cyclone dust collector according to the present invention.

A dust collecting chamber 210 is defined within the lower end portion of the cyclone casing 200 as shown in FIGS. 2 and 3.

As shown in the drawings, the dust collecting chamber 210 of the casing 200 collects solids, which are removed from dust-laden air due to gravity when the pressurized air forcibly swirls along the sidewall of the casing 200. In the embodiment of FIG. 2, the dust collecting chamber 210 is defined within the lower end portion of the casing 200, and is separated from the other portion of the interior of the casing 200 by a horizontal partition plate 250.

As best seen in FIG. 3, the horizontal partition plate 250 has a desired number of cutouts 253 along its outside edge at predetermined positions. The above cutouts 253 form openings between the plate 250 and the sidewall of the cyclone casing 200, thus allowing solids to pass down through the plate 250 so as to be dropped into the dust collecting chamber 210 when the solids move down along the internal surface of the sidewall of said casing 200. Of course, it should be understood that the construction of the means for allowing solids to pass down through the plate 250 so as to be dropped into the dust collecting chamber 210 is not limited to the above-mentioned cutouts 253. That is, such a means may be accomplished by at least one opening, which is formed on the horizontal partition plate 250 so as to allow the dust collecting chamber 210 to communicate with the other portion of the interior of the casing 200 through the opening. However, it is most preferable to form such openings along the outside edge of the partition plate 250 by forming the cutouts 253 along the edge of said plate 250.

In the preferred embodiment of the drawings, the partition plate 250 consists of two semicircular plate parts 251 and 252, each of which has a hinge shaft 251a or 252a along its linear edge. The two hinge shafts 251a and 252a of the semicircular plate parts 251 and 252 are commonly hinged to two hinge brackets 255, mounted on the sidewall of the casing 200 at diametrically opposite positions, at their opposite ends such that the two plate parts 251 and 252 are independently rotatable around their hinge shafts within the casing 200.

Two stoppers 256 are mounted to the interior surface of the sidewall of the cyclone casing 200 so as to support the lower surfaces of the arcuate edges of the two plate parts 251 and 252. Therefore, the two semicircular plate parts 251 and 252 are rotatable upward from the stoppers 256, but are not rotatable downward from the stoppers 256. Due to such a construction of the two plate parts 251 and 252, the two plate parts 251 and 252 are opened when the cyclone casing 200 is turned over. It is thus possible to easily remove collected solids from the dust collecting chamber 210 when desired.

Of course, it should be understood that the construction of the partition plate 250 is not limited to the abovementioned construction, but may be somewhat freely changed if the partition plate 250 can allow collected solids to be selectively removable from the dust collecting chamber 210 defined within the lower end portion of the cyclone casing 200. For example, the partition plate 250 may be formed as a single plate having a circular profile. In such a case, the partition plate 250 is hinged to two brackets, mounted to the interior surface of the sidewall of the casing 200 at diametrically opposite positions. This partition plate 250 is thus rotatable around its diametrical axis. Therefore, the partition plate 250 is opened when the cyclone casing 200 is leaned to a direction at a predetermined angle, and so it is possible to remove collected solids from the dust collecting chamber 210 as desired.

The operational effect of the cyclone dust collector of this invention will be described herein below.

When a vacuum cleaner having the cyclone dust collector of this invention is turned on, the suction motor 324 rotates the suction fan 322, and so a suction force acts within the cyclone casing 200. Therefore, dust-laden air is sucked under pressure from a target surface into the cyclone casing 200 through the air suction pipe 102 and the air inlet port 100.

Since the air inlet port 100 is mounted to the upper portion of the sidewall of the cyclone casing 200 such that the inside end of the port 100 is tangentially opened in the interior of the casing 200, a desired cyclone of air is formed within the casing 200. Therefore, dust-laden air under pressure forcibly swirls along the interior surface of the sidewall of the casing 200. During such a swirling action of the dust-laden air within the casing 200, relatively heavier solids or weighty particles are primarily removed from the dust-laden air through a cyclone dust collecting process. In such a case, the relatively heavier solids or weighty particles are dropped down along the interior surface of the sidewall of the casing 200, and pass through the cutouts 253 formed along the outside edge of the horizontal partition plate 250, thus being finally contained within the dust collecting chamber 210.

Meanwhile, microparticles, having an almost negligible weight, are not centrifugally forced toward the sidewall of the cyclone casing 200, but flows at the central portion within said casing 200. The primarily processed air laden with such microparticles passes through the filter 350 prior to flowing through the air exhaust port 302. When the primarily processed air passes through the filter 350 as described above, microparticles are almost completely removed from the air. Therefore, it is possible for the cyclone dust collector of this invention to discharge almost completely filtered air to the atmosphere through the air exhaust port 302, and the air exhaust pipe 310 provided with the suction fan 322.

The primarily removed solids or particles are collected within the dust collecting chamber 210. When it is desired to empty the chamber 210, the cyclone casing 200 is removed from the body of the vacuum cleaner, and is turned over to open the two plate parts 251 and 252 of the partition plate 250 due to gravity. When the two plate parts 251 and 252 are opened around their hinge shafts 251a and 252a due to gravity as described above, the collected solids and particles are removed from the chamber 210. It is thus possible to easily empty the dust collecting chamber 210 when necessary.

Figure 5:
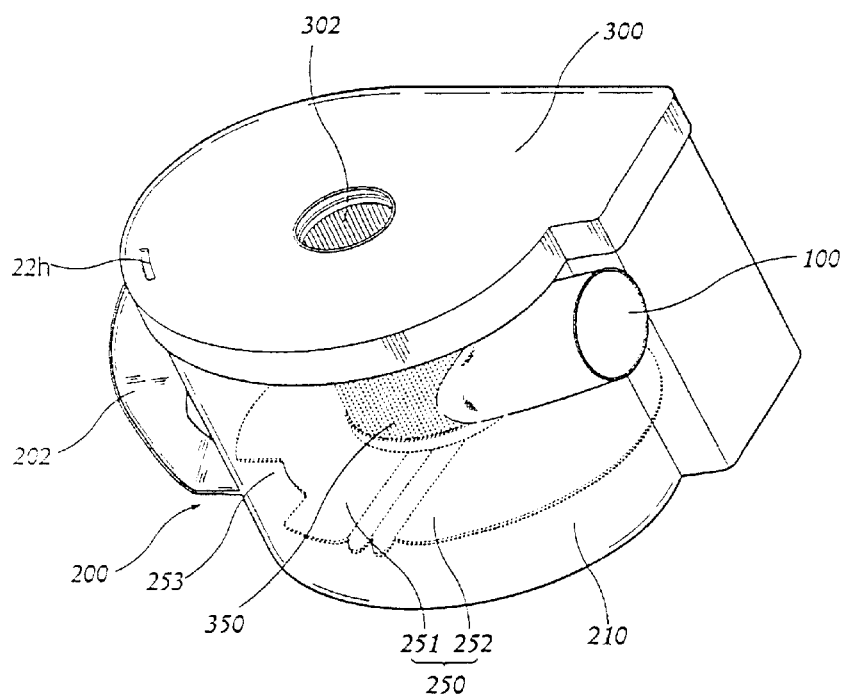
FIG. 5 is a perspective view, showing the appearance of a cyclone dust collection casing in accordance with an embodiment of the present invention.

FIG. 5 is a perspective view, showing the appearance of a cyclone casing in accordance with an embodiment of the present invention.

In the embodiment of FIG. 5, the general construction of the cyclone casing remains the same as that described for the embodiment of FIGS. 2 and 3, but is designed such that it is detachably installed within the body of a vacuum cleaner. That is, the cyclone casing 200 of FIG. 5 has a handle 202 at its rear end portion, thus being easily and simply inserted into or removed from the body of the cleaner as desired.

The cyclone dust collector of this invention is usable in a vacuum cleaner as will be described herein below.

Figure 6:
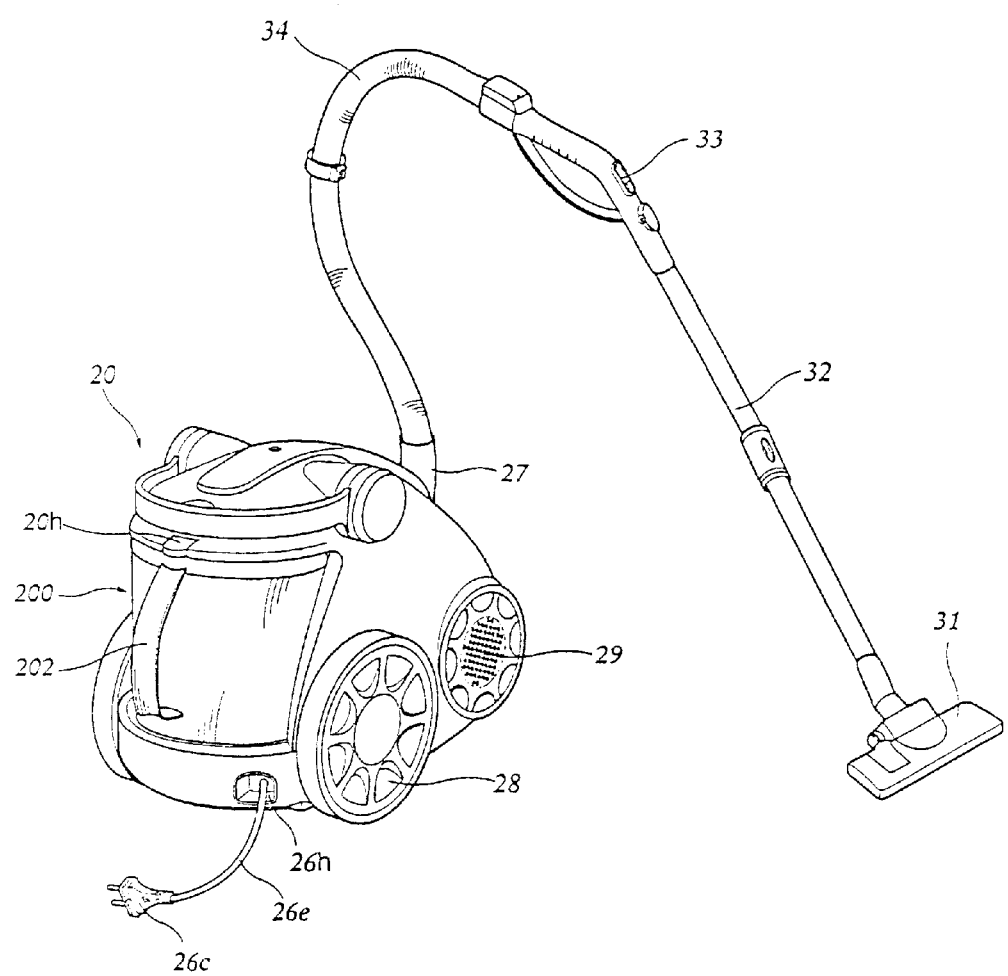
FIG. 6 is a perspective view of a vacuum cleaner using the cyclone dust collector of the present invention.

FIG. 6 is a perspective view of a vacuum cleaner using the cyclone dust collector of this invention. As shown in the drawing, the vacuum cleaner of this invention comprises a body 20 provided with a suction unit, and a suction nozzle 31 used for sucking dust-laden air from a target surface into the body 20 by a suction force of the suction unit. The vacuum cleaner also has a flexible suction hose 34, which is made of a flexible material and is detachably connected to an air suction port 27 of the body 20. A handle 33 is mounted to the outside end of the flexible suction hose 34, while an extension pipe 32 connects the suction nozzle 31 to the handle 33.

The above body 20 of the vacuum cleaner has the suction port 27 at its front end. This port 27 is connected to the flexible suction hose 34, and guides dust-laden air from the hose 34 into the body 20. The cyclone casing 200 of this invention is detachably set within the body 20, and is used for removing solids, particles and other impurities from the dust-laden air introduced from the hose 34 into the body 20 through the suction port 27. Two air exhaust grilles 29 are provided on the sidewall of the body 20 at opposite sides of the front portion of the body 20 for exhausting finally processed air from the body 20 to the atmosphere. Two wheels 28 are provided at opposite sides of the rear portion of the body 20 so as to allow the body 20 to smoothly move on a surface.

During an operation of the vacuum cleaner, the dust-laden air is sucked from the flexible suction hose 34 into the cyclone casing 200 of the body 20 through the suction port 27. Within the cyclone casing 200, solids, particles and other impurities are primarily and secondarily removed from the dust-laden air through a cyclone dust collecting process and a filtering process, and so it is possible to almost completely remove impurities, including microparticles, from the air. The processed air is, thereafter, discharged into the atmosphere through the two exhaust grilles 29. In the embodiment of the drawing, the two air exhaust grilles 29 are provided on the sidewall of the body 20 at opposite sides of the front portion of the body 20, and so it is possible to prevent the exhaust air from being directly blown toward a user, thus being convenient to the user during an operation of the cleaner.

The cyclone casing 200 is provided with the handle 202 for allowing the user to easily install or remove the casing 200 within or from the body 20 at the outside of said body 20. A locking button 20h is provided at the rear portion of the body 20 for locking the position of the cyclone casing 200 within the body 20, and so the casing 200 is prevented from being undesirably removed from the body 20 once the casing 200 is installed within the body 20.

An electric cord 26e, having a plug 26c at its outside end, is connected to a cord reel of the casing 200 while passing through a cord inlet port 26h of the body 20 such that the cord 26e is fully retractable into or fully extendible from the cord reel as desired.

The flexible suction hose 34 connects the extension pipe 32 having the suction nozzle 31 to the body 20, and so the hose 34 allows the suction nozzle 31 to easily reach a desired position on a target surface. The handle 33 is provided with a control panel, and so a user can easily control the operation of the cleaner. The extension pipe 32 connects the suction nozzle 31 to the handle 33. This extension pipe 32 transmits the suction force generated from the body 20 to the suction nozzle 31, and guides dust-laden air under pressure from the suction nozzle 31 into the cyclone casing 200 of the body 20.

Figure 7:
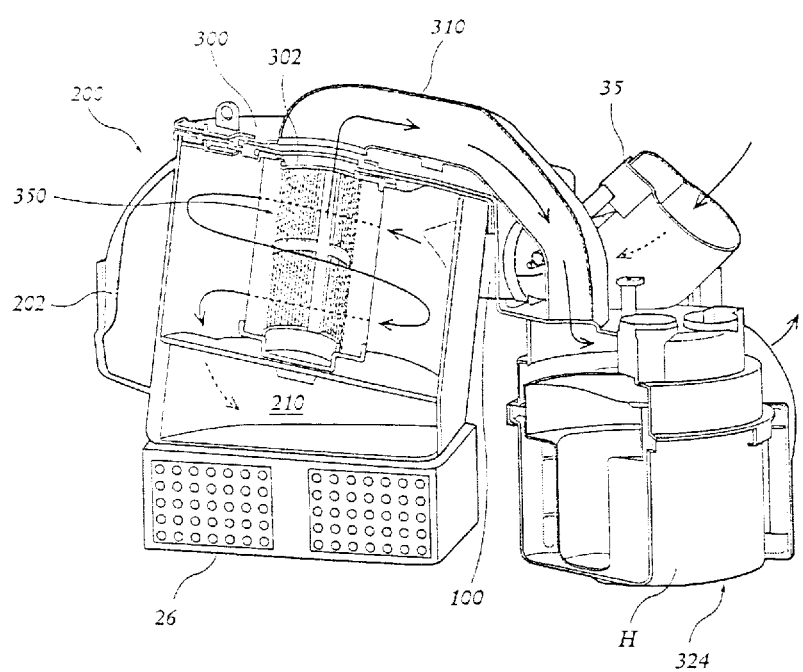
FIG. 7 is a view, showing the interior parts of the vacuum cleaner using the cyclone dust collector of the present invention.

FIG. 7 is a view, showing the interior parts of the vacuum cleaner using the cyclone dust collector of the present invention. As shown in the drawing, the vacuum cleaner of this invention also has a suction motor 324. A cord reel 26 is provided within the body 20 at a position in back of the motor 324 for receiving the electric cord 26e therein when the cord 26e is fully retracted. Of course, the cord 26e is fully extendible from the cord reel 26 when it is desired to perform a cleaning operation using the vacuum cleaner. The cyclone casing 200 of this invention is installed on the cord reel 26 within the body 20.

An inlet air guide pipe 35 connects the air inlet port 100 of the cyclone casing 200 to the suction port 27 of the body 20. This inlet air guide pipe 35 guides pressurized inlet air laden with dust from the suction nozzle 31 into the cyclone casing 200. An air exhaust pipe 310 extends from the air exhaust port 302 of the casing 200 to the top portion of the motor housing H, thus guiding exhaust air under pressure from the casing 200 to the motor 324.

The outside end of the inlet air guide pipe 35 is connected to the inside end of the suction port 27, while the inside end of the pipe 35 is connected to the air inlet port 100 of the cyclone casing 200. The air exhaust pipe 310 extends from the air exhaust port 302 formed on the lid 300 of the cyclone casing 200 to the top portion of the motor housing H.

The cyclone casing 200 is installed within the rear portion of the body 20 of the vacuum cleaner such that the casing 200 is easily removed from the body 20 when necessary. Therefore, a user can easily remove the casing 200 from the body 20 by gripping the handle 202 of the casing 200 when it is desired to empty the dust collecting chamber 210 of the casing 200.

Since the cyclone casing 200 is installed within the rear portion of the body 20 as described above, the user can easily install or remove the casing 200 within or from the body 20 as desired. The suction unit, consisting of the suction motor 324, is provided within the body 20 at a position in front of the casing 200, and so it is easy to mount the two air exhaust grilles 29 at opposite sides of the front portion of said body 20.

The cord reel 26 for the electric cord 26e is installed within the body 20 at a position under the cyclone casing 200. The electric cord 26e is fully retractable into or fully extendible from the cord reel 26 as desired, and so it is easy for a user to manipulate the cord 26e.

The operational effect of the above vacuum cleaner will be described herein below.

In order to perform a cleaning operation using the vacuum cleaner, the electric cord 26e is extended from the cord reel 26 to a desired length, and is connected to a wall outlet (not shown) at its plug 26c prior to turning on the vacuum cleaner. In such a case, it is possible for the user to freely start or stop the cleaner in addition to easily controlling the suction force of the cleaner by manipulating the control panel of the handle 33. The suction motor 324 is controllably operated in accordance with a selected mode of the cleaner, and so a desired suction force is generated by the motor 324.

Due to the suction force of the motor 324, the suction nozzle 31 sucks dust-laden air from a target surface into the body 20 through the extension pipe 32, the flexible hose 34 and the suction port 27.

Within the body 20 of the vacuum cleaner, the dust-laden air is introduced into the cyclone casing 200. Within the casing 200, solids, particles and other impurities are primarily and secondarily removed from the dust-laden air through a cyclone dust collecting process and a filtering process as described above. It is thus possible to almost completely remove impurities, including microparticles, from the air. The processed air is, thereafter, discharged from the body 20 to the atmosphere through the two air exhaust grilles 29.

In the operation of the vacuum cleaner, the finally processed air from the dust collecting filter 350 is introduced to the motor housing H through the air exhaust port 302 and the air exhaust pipe 310, thus cooling the motor housing H prior to being discharged to the atmosphere through the exhaust grilles 29.

After repeated cleaning operations of the vacuum cleaner, relatively heavier solids or weighty particles are contained in the dust collecting chamber 210 of the cyclone casing 200, while microparticles are deposited on the filtering surface of the dust collecting filter 350. Therefore, it is sometimes necessary to empty the dust collecting chamber 210 and to wash the filter 350. When it is desired to empty the dust collecting chamber 210 and to wash the filter 350, the cyclone casing 200 has to be removed from the body 20 of the cleaner. In such a case, the casing 200 can be easily and simply removed from the body 20 by pulling up the casing 200 from the body while gripping the handle 202 and pressing the locking button 20h down.

After the casing 200 is removed from the body 20, the lid 300 is removed from the cyclone casing 200. Thereafter, the filter 350 is removed from the air exhaust port 302 of the lid 300, and is washed to remove deposited microparticles from the filtering surface of the filter 350. In order to empty the dust collecting chamber 210, the cyclone casing 200 is turned over to open the partition plate 250. The relatively heavier solids and weighty particles are thus easily removed from the chamber 210 due to gravity.

As described above, the present invention provides a cyclone dust collector for vacuum cleaners. This cyclone dust collector comprises a cyclone casing, which is provided with a filter. Therefore, the cyclone dust collector primarily and secondarily removes solids, particles and other impurities, including microparticles, from the dust-laden air through a cyclone dust collecting process and a filtering process. It is thus possible to almost completely remove impurities, including microparticles, from air, and to improve the cleaning effect of a vacuum cleaner.

Another advantage of the cyclone dust collector of the present invention resides in that it has a simple construction in addition to primarily and secondarily removing solids, particles and other impurities, including microparticles, from dust-laden air. Therefore, this cyclone dust collector is easily produced through a simple production process, and accomplishes the recent trend of compactness of vacuum cleaners.

The cyclone dust collector of this invention is also designed to easily and simply remove collected solids, particles and other impurities from the dust collecting chamber of the cyclone casing. The cyclone dust collector is thus convenient to users of vacuum cleaners.

The cyclone casing of this dust collector is also designed such that it is easy and simple to remove the cyclone casing from the body of a vacuum cleaner when necessary. This improves usability of a vacuum cleaner provided with the cyclone dust collector of this invention.

In addition, the cyclone casing of this invention is installed within the body of a vacuum cleaner such that the cord reel for the electric cord of the vacuum cleaner is positioned under the cyclone casing. This improves the spacial efficiency of the interior of the cleaner body, and accomplishes the recent trend of compactness of vacuum cleaners.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cyclone dust collector for vacuum cleaners, comprising:

an openable cyclone dust collection casing;

an air inlet port formed on a sidewall of said casing such that the air inlet port introduces dust-laden air under pressure into the casing while forming a cyclone of the air within said casing;

an air exhaust port provided at a top end of said casing for discharging the air from the casing to the atmosphere;

a dust collecting filter provided within said casing for filtering the air before the air is discharged from the casing to the atmosphere through the air exhaust port; and a partition plate horizontally installed within said casing at a lower portion to define a dust collecting chamber within the casing at a position under the partition plate, said partition plate being provided with an opening for allowing solids and particles, removed from the air, to pass through the partition plate to reach the dust collecting chamber, wherein said partition plate comprises two semi-circular plate parts, said two semi-circular plate parts being commonly hinged to diametrically opposite positions of said casing at opposite ends of their linear edges.

2. The cyclone dust collector according to claim 1, wherein said cyclone dust collection casing comprises:

a lower body being open at its top; and a lid covering the open top of said lower body.

3. The cyclone dust collector according to claim 2, wherein said air inlet port is formed at an upper portion of the sidewall of said casing, while said air exhaust port is formed at a central portion of said lid.

4. The cyclone dust collector according to claim 3, wherein said dust collecting filter is mounted to a lower surface of said lid at a central position.

5. The cyclone dust collector according to claim 4, wherein said dust collecting filter is detachably mounted to said lid.

6. The cyclone dust collector according to claim 1, wherein said opening of the partition plate is defined by a cutout formed along an outside edge of said partition plate.

7. The cyclone dust collector according to claim 1, wherein said partition plate is rotatably mounted to the sidewall of said casing.

8. The cyclone dust collector according to claim 1, further comprising two stoppers interiorly mounted to the sidewall of said casing so as to support lower surfaces of arcuate edges of said two plate parts, said two plate parts thus being rotatable only upward from said stoppers.

9. The cyclone dust collector according to claim 1, wherein said dust collecting filter has a predetermined strength capable of enduring the pressure of the air passing through said filter.

10. The cyclone dust collector according to claim 1, wherein said dust collecting filter has a cylindrical shape.

11. The cyclone dust collector according to claim 1, wherein said dust collecting filter is corrugated on its surface to have an enlarged air contact surface.

12. The cyclone dust collector according to claim 11, wherein said dust collecting filter is longitudinally corrugated around its circumference.

13. The cyclone dust collector according to claim 1, wherein said dust collecting filter is made of polyester.

14. A vacuum cleaner, comprising:
 a body having both an air suction port for receiving dust-laden air under pressure and an air exhaust port for discharging the air from the body to the atmosphere after filtering the air, wherein said air suction port is provided at a front wall of said body, and said air exhaust port is provided at a front portion of a sidewall of said body;
 a suction unit provided within said body at a front portion and generating a suction force for sucking the dust-laden air into the body; and
 dust collecting means for collecting solids, particles and other impurities from the dust-laden air introduced into said body through the air suction port, thus removing them from said air, said dust collecting means being detachably installed within said body at a rear portion.

15. The vacuum cleaner according to claim 14, wherein a cord reel is provided within said body at a position under the dust collecting means, said cord reel receiving an electric cord of the vacuum cleaner therein when the cord is fully retracted.

16. The vacuum cleaner according to claim 14, wherein said dust collecting means comprises:
 an openable cyclone dust collection casing;
 an air inlet port formed on a sidewall of said casing such that the air inlet port introduces dust-laden air under pressure into the casing while forming a cyclone of the air within said casing;
 an air exhaust port provided at a top end of said casing for discharging the air from the casing to the atmosphere;
 a dust collecting filter provided within said casing for filtering the air before the air is discharged from the casing to the atmosphere through the air exhaust port; and
 a partition plate horizontally installed within said casing at a lower portion to define a dust collecting chamber within the casing at a position under the partition plate, said partition plate being provided with an opening for allowing solids and particles, removed from the air, to pass through the partition plate to reach the dust collecting chamber.

17. A vacuum cleaner, comprising:
 a body including an air suction port for receiving dust-laden air through a suction hose connected at a front end of the body and an air exhaust port for discharging the air from the body after filtering the air;
 a suction unit installed at a front portion within the body for providing a driving force for allowing the air to be introduced into and discharged from the body;
 cyclone dust-collecting means detachably installed from the outside of the body directly into the body at a rear portion corresponding to a rear end of the suction unit for filtering dust-laden air; and
 fastening means for mounting and fastening the dust-collecting means to the body.

18. The vacuum cleaner according to claim 17, wherein the air suction port and the dust-collecting means communicate with each other through a suction passage provided within the body, and the dust-collecting means and the suction unit communicate with each other through a discharge passage.

19. The vacuum cleaner according to claim 17, wherein the dust-collecting means comprises:
 an openable casing;
 an air inlet port formed on a side wall of the casing for allowing the air to be introduced into and to be swirled within the casing;
 an air exhaust port provided at a top surface of the casing for discharging the air from the casing to the atmosphere;
 a dust-collecting filter provided within the casing for filtering the air before the air is discharged to the atmosphere through the air exhaust port; and
 a partition plate horizontally installed within the casing at a lower portion thereof for defining a dust-collecting chamber within the casing at a position below the partition plate, said partition plate including an opening for allowing foreign materials in the air to pass therethrough so as to reach the chamber.

20. The vacuum cleaner according to claim 17, wherein the dust-collecting means is provided with a handle for facilitating a handling operation of the dust-collecting means.

* * * * *